United States Patent
Mikic et al.

(10) Patent No.: US 10,919,641 B2
(45) Date of Patent: *Feb. 16, 2021

(54) SYSTEM AND METHOD FOR AIRSPEED DETERMINATION

(71) Applicant: Joby Aero, Inc., Santa Cruz, CA (US)

(72) Inventors: Gregor Veble Mikic, Santa Cruz, CA (US); Jason Ryan, Santa Cruz, CA (US); JoeBen Bevirt, Santa Cruz, CA (US)

(73) Assignee: Joby Aero, Inc, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,733

(22) Filed: Jun. 5, 2020

(65) Prior Publication Data

US 2020/0324910 A1 Oct. 15, 2020

Related U.S. Application Data

(63) Continuation of application No. 16/453,446, filed on Jun. 26, 2019, now Pat. No. 10,710,741.

(60) Provisional application No. 62/693,232, filed on Jul. 2, 2018.

(51) Int. Cl.
| | | |
|---|---|---|
| *B64D 43/02* | (2006.01) | |
| *G01P 5/00* | (2006.01) | |
| *G01P 5/02* | (2006.01) | |
| *G01P 21/02* | (2006.01) | |

(52) U.S. Cl.
CPC ............ *B64D 43/02* (2013.01); *G01P 5/00* (2013.01); *G01P 5/02* (2013.01); *G01P 21/025* (2013.01)

(58) Field of Classification Search
CPC ... B64D 43/02; G01P 5/00; G01P 5/02; G01P 21/025
See application file for complete search history.

(56) References Cited

U.S. PATENT DOCUMENTS

| | | |
|---|---|---|
| 1,386,713 A | 8/1921 | Leinweber et al. |
| 1,496,723 A | 6/1924 | Miller |
| 1,794,202 A | 2/1931 | Pickard |

(Continued)

FOREIGN PATENT DOCUMENTS

| | | |
|---|---|---|
| CN | 103363993 B | 4/2016 |
| CN | 107042884 A | 8/2017 |

(Continued)

OTHER PUBLICATIONS

European Search Report for Application No. 15765064.9 dated Oct. 16, 2017.

(Continued)

*Primary Examiner* — J. Woodrow Eldred
(74) *Attorney, Agent, or Firm* — Jeffrey Schox

(57) ABSTRACT

A method for determining airspeed of an aircraft that includes determining a rotor model relating a power coefficient of a propeller of the aircraft to an axial inflow velocity through the propeller as a function of a set of rotor operating parameters; determining the set of rotor operating parameters by sampling an electronic control signal associated with an electric motor actuating the propeller; computing the axial inflow velocity through the propeller based on the set of rotor operating parameters using the rotor model; and determining the airspeed based on the axial inflow velocity.

21 Claims, 4 Drawing Sheets

(56) References Cited

U.S. PATENT DOCUMENTS

| | | |
|---|---|---|
| D171,509 S | 2/1954 | Lightborn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Sterling |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |
| 3,089,666 A | 5/1963 | Quenzler |
| 3,136,499 A | 6/1964 | Kessler |
| 3,141,633 A | 7/1964 | Mackay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,146,199 A | 3/1979 | Wenzel |
| 4,356,546 A | 10/1982 | Whiteside et al. |
| 4,387,866 A | 6/1983 | Eickmann |
| 4,519,746 A | 5/1985 | Wainauski et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,184,304 A | 2/1993 | Huddle |
| 5,374,010 A | 12/1994 | Stone et al. |
| 5,405,105 A | 4/1995 | Kress |
| 5,419,514 A | 5/1995 | Duncan |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 6,098,923 A | 8/2000 | Peters |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,474,604 B1 | 11/2002 | Carlow |
| 6,561,455 B2 | 5/2003 | Capanna |
| 6,625,033 B1 | 9/2003 | Steinman |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 8,016,226 B1 | 9/2011 | Wood |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn |
| 8,485,464 B2 | 7/2013 | Kroo |
| 8,527,233 B2 | 9/2013 | McIntyre |
| 8,602,347 B2 | 12/2013 | Isaac et al. |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B1 | 9/2014 | Walter |
| 8,998,125 B2 | 4/2015 | Hollimon et al. |
| 9,102,401 B2 | 8/2015 | Collins et al. |
| 9,128,109 B1 | 9/2015 | ONeill |
| 9,415,870 B1 | 8/2016 | Beckman et al. |
| 9,435,661 B2 | 9/2016 | Brenner et al. |
| 9,694,911 B2 | 7/2017 | Bevirt et al. |
| 9,786,961 B2 | 10/2017 | Dyer et al. |
| 9,944,386 B1 | 4/2018 | Reichert et al. |
| 9,963,228 B2 | 5/2018 | McCullough et al. |
| 10,046,855 B2 | 8/2018 | Bevirt et al. |
| 10,144,503 B1 | 12/2018 | Vander Lind et al. |
| 10,183,746 B2 | 1/2019 | McCullough et al. |
| 10,246,184 B2 | 4/2019 | Ragland |
| 10,287,011 B2 | 5/2019 | Wolff et al. |
| 10,364,036 B2 | 7/2019 | Tighe et al. |
| 10,497,996 B1 | 12/2019 | Muniz et al. |
| 10,513,334 B2 | 12/2019 | Groninga et al. |
| 2003/0038213 A1 | 2/2003 | Yoeli |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0094537 A1 | 5/2003 | Austen-Brown |
| 2003/0106959 A1 | 6/2003 | Fukuyama |
| 2004/0126241 A1 | 7/2004 | Zha et al. |
| 2004/0195460 A1 | 10/2004 | Sailer |
| 2004/0245376 A1 | 12/2004 | Muren |
| 2005/0178879 A1 | 8/2005 | Mao |
| 2005/0230524 A1 | 10/2005 | Ishiba |
| 2006/0016930 A1 | 1/2006 | Pak |
| 2006/0097103 A1 | 5/2006 | Atmur |
| 2006/0113426 A1 | 6/2006 | Yoeli |
| 2006/0226281 A1 | 10/2006 | Walton |
| 2007/0221779 A1 | 9/2007 | Ikeda |
| 2008/0048065 A1 | 2/2008 | Kuntz |
| 2008/0205416 A1 | 8/2008 | DeChiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0072325 A1 | 3/2010 | Sambell |
| 2010/0076625 A1 | 3/2010 | Yoeli |
| 2010/0100260 A1 | 4/2010 | McIntyre et al. |
| 2010/0193644 A1 | 8/2010 | Karem |
| 2010/0264257 A1 | 10/2010 | Brunken |
| 2010/0270419 A1 | 10/2010 | Yoeli |
| 2010/0270435 A1 | 10/2010 | Karem |
| 2011/0001020 A1 | 1/2011 | Forgac |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |

(56) References Cited

U.S. PATENT DOCUMENTS

| | | | |
|---|---|---|---|
| 2011/0315809 A1 | 12/2011 | Oliver | |
| 2012/0025016 A1 | 2/2012 | Methven et al. | |
| 2012/0061526 A1 | 3/2012 | Brunken | |
| 2012/0091257 A1 | 4/2012 | Wolff et al. | |
| 2012/0234968 A1 | 9/2012 | Smith | |
| 2013/0132548 A1 | 5/2013 | Cabos | |
| 2013/0201316 A1 | 8/2013 | Binder et al. | |
| 2013/0204544 A1 | 8/2013 | Thomas | |
| 2014/0046510 A1* | 2/2014 | Randolph | G01P 13/045 701/14 |
| 2014/0299708 A1 | 10/2014 | Green et al. | |
| 2014/0358333 A1 | 12/2014 | White et al. | |
| 2015/0012154 A1 | 1/2015 | Senkel et al. | |
| 2015/0056058 A1 | 2/2015 | Grissom et al. | |
| 2015/0102659 A1 | 4/2015 | Liffring et al. | |
| 2015/0136897 A1 | 5/2015 | Seibel et al. | |
| 2015/0147181 A1 | 5/2015 | Henze et al. | |
| 2015/0232178 A1 | 8/2015 | Reiter | |
| 2015/0266571 A1 | 9/2015 | Bevirt et al. | |
| 2015/0360794 A1 | 12/2015 | Certain et al. | |
| 2016/0031555 A1 | 2/2016 | Bevirt et al. | |
| 2016/0031556 A1 | 2/2016 | Bevirt et al. | |
| 2016/0083073 A1 | 3/2016 | Beckman | |
| 2016/0112151 A1 | 4/2016 | Chedas et al. | |
| 2016/0144957 A1 | 5/2016 | Claridge et al. | |
| 2016/0272312 A1 | 9/2016 | Mallard | |
| 2016/0294882 A1 | 10/2016 | Michaels | |
| 2016/0304194 A1 | 10/2016 | Bevirt et al. | |
| 2017/0101176 A1 | 4/2017 | Alber et al. | |
| 2017/0104385 A1 | 4/2017 | Salamon et al. | |
| 2017/0267371 A1* | 9/2017 | Frolov | G01F 1/68 |
| 2017/0274983 A1 | 9/2017 | Beckman et al. | |
| 2017/0277152 A1 | 9/2017 | Liu et al. | |
| 2017/0297431 A1 | 10/2017 | Epstein et al. | |
| 2018/0002016 A1 | 1/2018 | McCullough et al. | |
| 2018/0105279 A1 | 4/2018 | Tighe et al. | |
| 2018/0237148 A1 | 8/2018 | Hehn et al. | |
| 2018/0244370 A1 | 8/2018 | Lombard | |
| 2018/0251226 A1 | 9/2018 | Fenny et al. | |
| 2018/0290736 A1 | 10/2018 | Mikic et al. | |
| 2018/0319491 A1 | 11/2018 | Kearney-Fischer | |
| 2018/0354615 A1 | 12/2018 | Groninga et al. | |
| 2018/0356439 A1 | 12/2018 | Luo et al. | |
| 2019/0210740 A1 | 7/2019 | Luo | |
| 2019/0214161 A1 | 7/2019 | Chen et al. | |

FOREIGN PATENT DOCUMENTS

| | | |
|---|---|---|
| DE | 102012104783 A1 | 12/2013 |
| EP | 0945841 A1 | 9/1999 |
| EP | 3366583 A1 | 8/2018 |
| GB | 1271102 A | 4/1972 |
| WO | 03074924 A1 | 9/2003 |
| WO | 03086857 A1 | 10/2003 |
| WO | 2019001203 A1 | 1/2019 |
| WO | 2019056053 A1 | 3/2019 |

OTHER PUBLICATIONS

International Search Report and Written Opinion for Application No. PCT/US10/46500 dated Apr. 13, 2011.
International Search Report and Written Opinion for Application No. PCT/US15/21344 dated Sep. 11, 2015.
International Search Report and Written Opinion for Application No. PCT/US15/21350 dated Sep. 15, 2015.
International Search Report and Written Opinion for Application No. PCT/US2017/059809 dated Jul. 31, 2018.
International Search Report and Written Opinion for PCT Application No. PCT/US2019/039247 dated Sep. 13, 2019.
International Search Report and Written Opinion for PCT Application No. PCT/US2019035236 dated Aug. 20, 2019.
"Airfolds Blade Profile", Mecaflux Heliciel, Propeller & Wing, https://www.heliciel.com/en/aerodynamique-hydrodynamique/profils%20aile%20profil%20pale.htm.
"Curtiss-Wright X-19", Wikipedia, https://en.wikipedia.org/wiki/Curtiss-Wright_X-19.
"Inclined Flat Plate", Aerodynamics of the airplane, Feb. 13, 2016.
"International Search Report and Written Opinion of the ISA dated Dec. 4, 2019 for PCT/US19/51565."
"International Search Report and Written Opinion of the ISA, dated Jul. 24, 2019, for application No. PCT/US19/31863."
Carson, Biz, "First Look: Uber Unveils New Design for Uber Eats Delivery Drone", https:www.forbes.com/sites/bizcarson/2019/10/28/first-look-uber-unveils-new-design-for-uber-eats-delivery-drone/#1703f8d778f2.
Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.
Falco, Gianluca , et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.
Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.
Kim, Tae , "Reduction of Tonal Propeller Noise by Means of Uneven Blade Spacing", University of California, Irvine, Thesis, publication date 2016.
Saraf, A. Amit Kumar , et al., "Study of Flow Separation on Airfoil with Bump", International Journal of Applied Engineering Research ISSN 09773-4562, vol. 13, No. 16 (2018), pp. 128686-12872.
Sullivan, Brenda M., et al., "A Subject Test of Modulated Blade Spacing for Helicopter Main Rotors", Presented at Ihe American Helicopter Society 58th Annual Forum, Montreal, Canada, Jun. 11-13, 2002, http://ntrs.nasa.gov/search.isp.
Yeh, Y.C. (BOB) , "Triple-Triple Redundant 777 Primary Flight Computer", 1996, IEEE, pp. 293-307 (Year: 1996).
Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.

* cited by examiner

SYSTEM AND METHOD FOR AIRSPEED DETERMINATION

CROSS-REFERENCE TO RELATED APPLICATIONS

The application is a continuation of U.S. application Ser. No. 16/453,446, filed 26 Jun. 2019, which claims the benefit of U.S. Provisional Application No. 62/693,232, filed 2 Jul. 2018, each of which is incorporated herein in its entirety by this reference.

TECHNICAL FIELD

This invention relates generally to the flight parameter measurement field, and more specifically to a new and useful method for airspeed measurement in the flight parameter measurement field.

BACKGROUND

Airspeed is one of the most important parameters that an aircraft operator (e.g., pilot) uses to control an aircraft and understand its performance in flight. Failure to accurately indicate the airspeed of an aircraft can lead to improper control inputs being provided by an aircraft operator, component damage, and/or unplanned (e.g., undesirable) loss of vehicle control and/or the vehicle itself.

Thus, there is a need in the inflight diagnostics field to create a new and useful method for airspeed determination. This invention provides such a new and useful method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
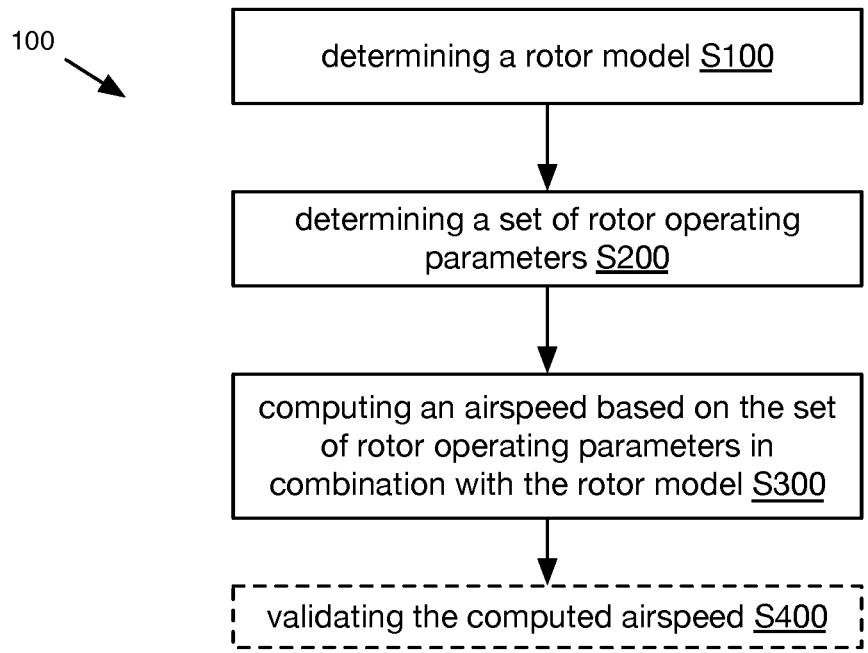
FIG. 1 depicts a flowchart illustration of a method for airspeed determination.

As shown in FIG. 1, the method 100 for determining airspeed can include: determining a rotor model S100, determining a set of rotor operating parameters S200, and computing an airspeed based on the set of rotor operating parameters in combination with the rotor model S300. The method 100 can optionally include: computing forces and/or moments on the aircraft based on the set of rotor operating parameters in combination with the rotor model S350, validating the computed airspeed S400, and/or any other suitable processes and/or blocks related to determining airspeed.

The method functions to determine the airspeed of an aircraft during forward motion through the air. The airspeed is preferably defined as the speed of the freestream relative to the aircraft during flight, but can additionally or alternatively be otherwise suitably defined. The method can also function to determine a model of rotor performance (e.g., a rotor model) to utilize in determining the airspeed (e.g., among a plurality of models, based on historical data, in real-time, etc.). The method can also function to provide one of a plurality of independently-derived airspeed measurements to an aircraft operator (e.g., pilot, autopilot, autonomous agent, remote control system, etc.). However, the method 100 can additionally or alternatively have any other suitable function.

Figure 2:
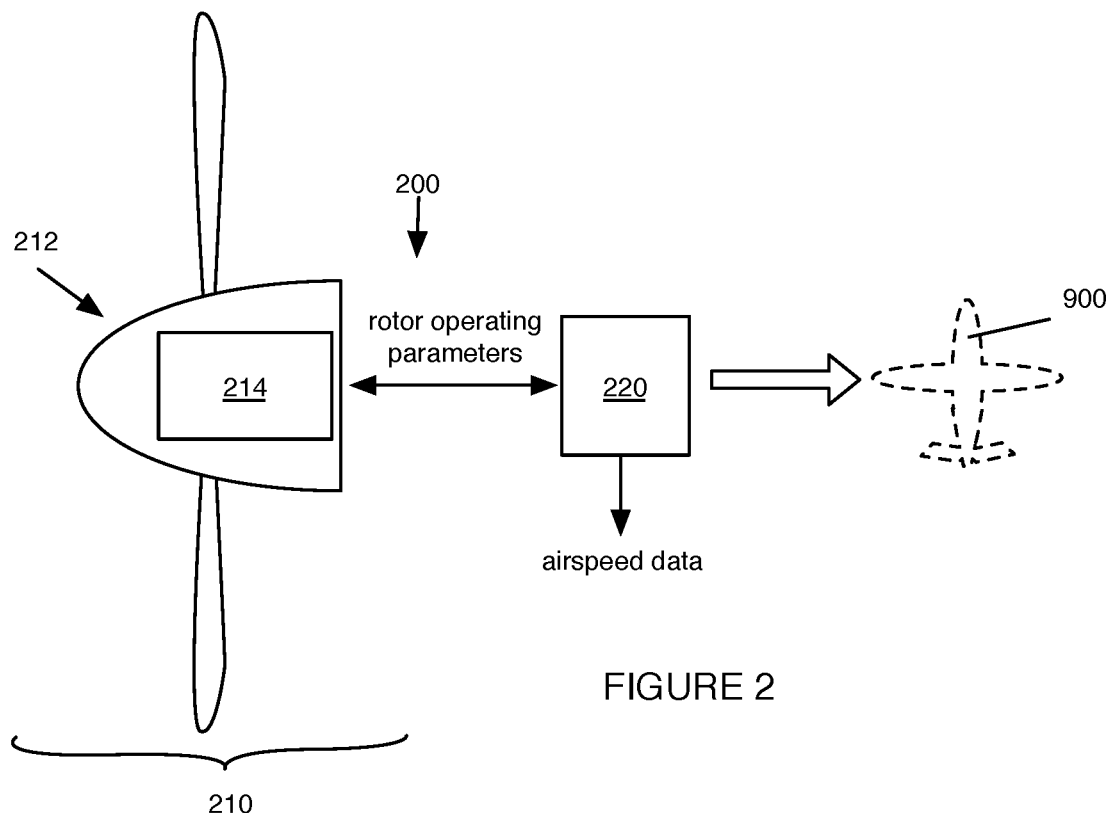
FIG. 2 depicts a diagram of a system for airspeed determination.

As shown in FIG. 2, the system 200 for determining airspeed can include: a rotor assembly 210 and a control system 220. The rotor assembly 210 includes a rotor 212 and a drive mechanism 214. In some variations, the system 200 can include a plurality of rotor assemblies 210. The system 200 can additionally or alternatively include any other suitable components.

The system 200 functions to determine the airspeed of an aircraft (e.g., an aircraft utilizing a variation of the system 200 for propulsion). The system 200 can also function to propel an aircraft (e.g., by providing thrust via rotary aerodynamic propulsion, simultaneously with providing an airspeed measurement or independently of providing an airspeed measurement). The system 200 can also function to provide state feedback from which rotor operating parameters can be determined (e.g., in accordance with one or more variations of Block S200 of the method 100).

The method 100 is preferably implemented by a system 200 or a substantially similar system; however, the method 100 can additionally or alternatively be implemented or executed at any other suitable system. The method can be implemented by, in conjunction with, or otherwise in association with various related systems. In particular, the method is preferably implemented at an aircraft 900, wherein one or more rotor assemblies 210 are attached to the aircraft 900 to act as a propulsion system. The aircraft is preferably electric, and accordingly each of the one or more rotor assemblies preferably includes an electric motor (e.g., wherein the drive mechanism includes an electric motor) and a rotor. However, in alternative variations, the aircraft can be powered and/or driven by any other suitable drive mechanism or powertrain (e.g., a non-electric powertrain and/or drive mechanism). The rotor of the rotor assembly functions to provide propulsive force to the aircraft (e.g., under actuation by a torque provided by the drive mechanism).

The rotor can have any suitable number of blades; the rotor preferably has five blades, but can alternatively have three blades, four blades, six blades, and any other suitable number of blades. The blades can be: rigidly fixed to a hub (e.g., as a fixed-pitch propeller); coupled to a hub and including variable pitch capability (e.g., by way of a suitable variable pitch linkage, cyclic pitch control, etc.), and/or connected to a hub or rotor head by one or more hinges (e.g., a drag hinge, a flap hinge, etc.) to enable blades to lead, lag, and/or flap relative to the hub or rotor head during rotation of the rotor under aerodynamic loading. However, the blades can be otherwise suitably coupled to one another and/or otherwise suitably mechanically linked to form at least a portion of the rotor. In a specific example, the rotor includes five variable-pitch blades, wherein the blade pitch angle $\beta$ is controllable by a system controller.

The term "rotor" as utilized herein can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The aircraft is preferably a tiltrotor aircraft with a plurality of rotor assemblies, operable between a forward arrangement and a hover arrangement. However, the aircraft can alternatively be a fixed wing aircraft with one or more rotor assemblies, a helicopter with one or more rotor assemblies, and/or any other suitable aircraft or vehicle propelled by rotors. The method 100 is preferably implemented using a rotor arranged with a non-zero forward tilt (e.g., wherein the thrust vector generated by the rotor during operation has at least a non-zero horizontal component); however, in variations, the method 100 can be implemented utilizing any suitable rotor or plurality of rotors in any suitable arrangement or orientation. The aircraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

Figures 4A, 4B:
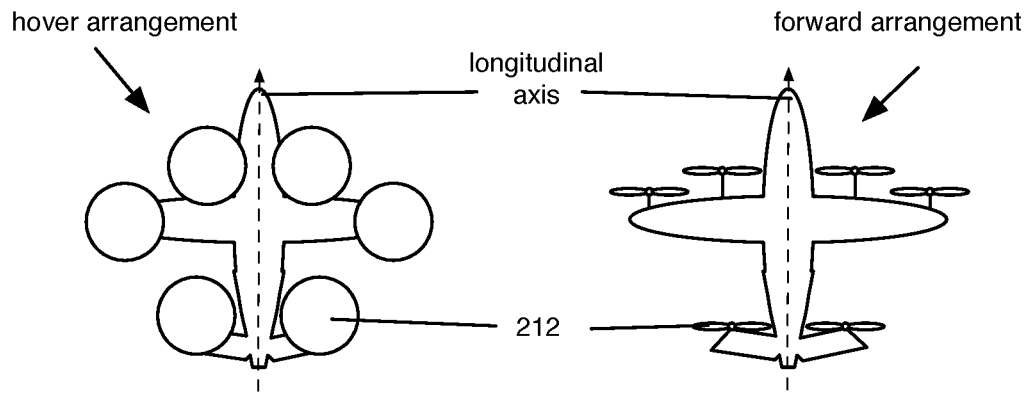
FIGS. 4A-4B depict an example of an aircraft used in conjunction with the system and method for airspeed measurement in a hover arrangement and forward arrangement, respectively.

In a specific example of the system implemented in conjunction with an aircraft, as shown in FIGS. 4A-4B, the aircraft can include six rotor assemblies operable between a forward arrangement, wherein each of the rotor assemblies is oriented such that the rotor axis is substantially parallel to the longitudinal axis of the aircraft (e.g., as shown in FIG. 4B), and a hover arrangement, wherein each of the rotor assemblies is oriented such that the rotor axis is substantially perpendicular to the longitudinal axis of the aircraft (e.g., as shown in FIG. 4A). The aircraft can, in examples, be an aircraft substantially as described in U.S. patent application Ser. No. 16/409,653, filed 10 May 2019, which is incorporated herein in its entirety by this reference. However, in alternative examples, the system can be implemented in conjunction with any suitable aircraft utilizing a rotary aerodynamic actuator and capable of forward flight under the propulsive force of the rotary aerodynamic actuator.

However, the method 100 and system 200 can additionally or alternatively be utilized in conjunction with any other suitable related systems.

Figure 3A:
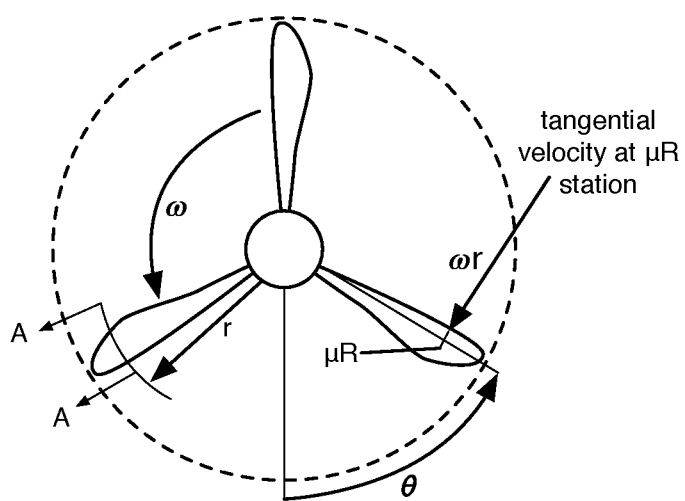
FIG. 3A depicts a frontal view of an example of a rotor of the system for airspeed measurement, and graphical representations of various parameters utilized in one or more variations of the method for airspeed measurement.
Figure 3B:
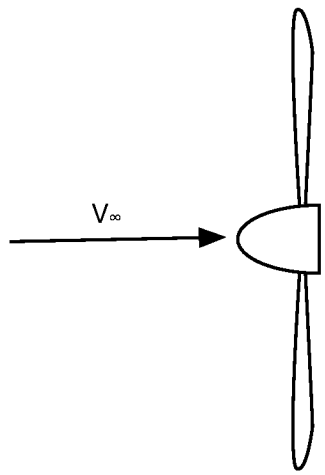
FIG. 3B depicts a side view of the example rotor of FIG. 3A, and graphical representations of various parameters utilized in one or more variations of the method for airspeed measurement.
Figure 3C:
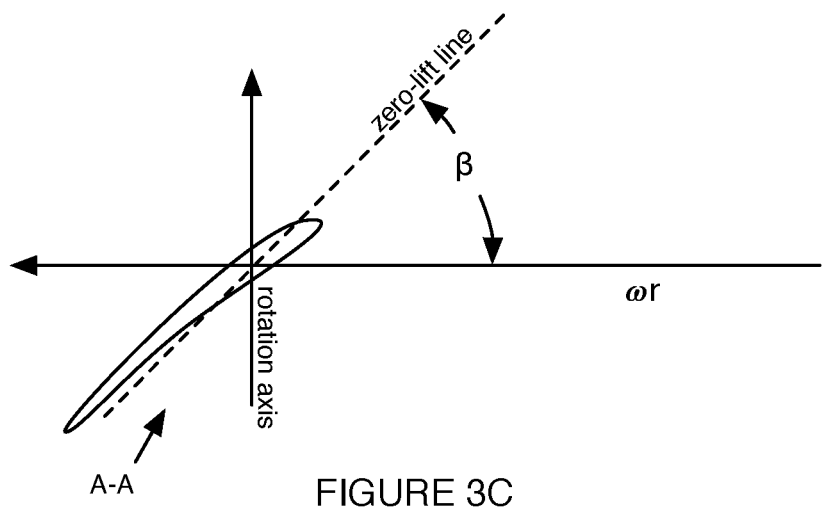
FIG. 3C depicts a cross sectional view (at section A-A) of a blade of the rotor depicted in FIG. 3A, and graphical representations of various parameters utilized in one or more variations of the method for airspeed measurement.

As shown in FIGS. 3A, 3B, and 3C, various geometric and physical quantities and features are related to the method 100 and/or variations thereof. At a given operating condition (e.g., set of operating parameters, set of rotor operating parameters, etc.), the rotor rotates about the rotor axis at angular velocity $\omega$, and each position along the span of a blade of the rotor (e.g., at a position r between o and R, wherein R is the total length of the blade) experiences an effective oncoming flow velocity due to this rotation in the $\theta$ direction of $\omega r$, as shown in FIG. 3A. The freestream velocity $V_\infty$ (e.g., the velocity of the air upstream of the aircraft, prior to deflection, deceleration, and/or compression of the air by the aircraft or another aerodynamic body) reaches the disc of the rotor (e.g., rotor disc) out of the disc plane (e.g., normal to the disc plane, oblique to the disc plane, etc.), as shown in FIG. 3B. At each radial position of the blade, the blade defines a cross section (e.g., an airfoil cross section) such as the example depicted in FIG. 3C (e.g., section A-A). The blade can be inclined at an angle $\beta$ relative to the disc plane (e.g., between the direction defined by the $\omega r$ vector and the zero-lift line, wherein the zero-lift line is the axis parallel to which the blade will generate no lift when moving; the angle of attack of the blade; etc.); the blade angle can additionally or alternatively be defined as a deviation from the rotation axis, wherein the rotation axis (e.g., rotor axis) is defined as the axis about which the rotor rotates during operation.

Figure 5:
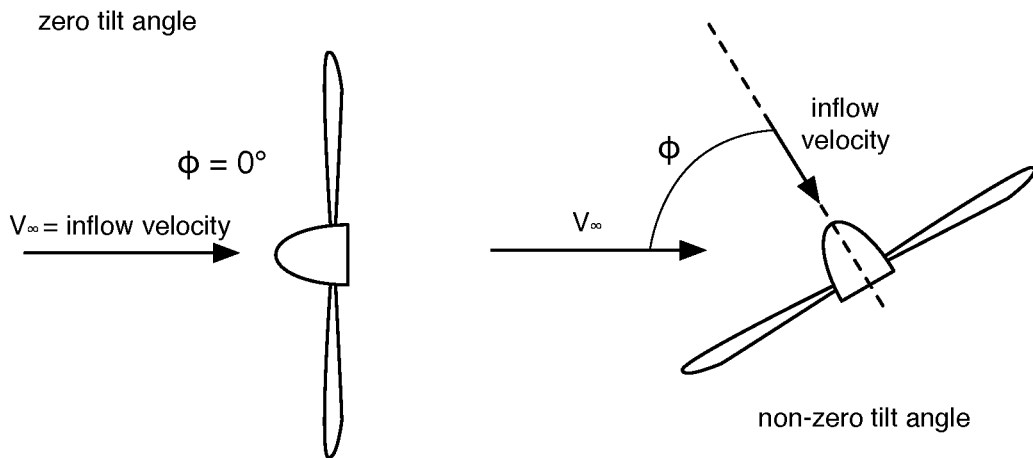
FIG. 5 depicts example tilt angles between the rotor axis and the freestream velocity vector, consistent with one or more variations of the system and method for airspeed measurement.

In some variations (e.g., wherein the system is used in conjunction with a tiltrotor aircraft), the rotor assembly can be configurable between a forward configuration and a hover configuration. Thus, as shown in FIG. 5, the disc plane of one or more rotors can be rotated between a tilt angle of $\phi=0°$ with respect to the freestream direction and a tilt angle greater than o with respect to the freestream direction (e.g., $\phi=90°$) and/or to a hypothetical freestream direction associated with forward flight in cases wherein the aircraft is not necessarily actively engaged in forward flight (e.g., wherein the aircraft is hovering). The freestream direction may be parallel with a ground surface or at an angle with respect to the ground surface, in relation to the aforementioned tilt angles.

2. Benefits

The system and method and variations thereof can afford several benefits and/or advantages.

First, variations of the system and/or method can enable an aircraft to accurately measure its airspeed in conditions that may reduce or negate the effectiveness of conventional airspeed measurement techniques. For example, under certain environmental conditions, ice can form on or around pitot tube inlets and prevent accurate pressure transduction; this can cause an aircraft operator to provide inaccurate control inputs (e.g., control inputs based on an inaccurate airspeed indication) that can in turn lead to adverse events (e.g., stall, crash, loss of stability, loss of efficiency, etc.). The system and method are typically not susceptible to such environmental conditions, because in any situation in which the aircraft is actively operated (e.g., during powered flight) one or more rotor assemblies are necessarily functional, and thus the airspeed can often be inferred in accordance with one or more variations of the system and/or method.

Second, variations of the system and/or method can provide a redundant airspeed measurement to aircraft equipped with alternative means of airspeed measurement and indication. In such variations, the system and/or method can be the primary means of airspeed determination or a secondary means of airspeed determination. For example, the method can be used to determine the airspeed displayed to an operator (e.g., a pilot, an autonomous vehicle control system, a teleoperator, etc.) until and/or unless a trigger condition is reached (e.g., disagreement between the airspeed determined via the method and via an alternative means increases above a threshold disagreement value), at or around which point the alternative mechanism can be employed (e.g., in addition to the method, in lieu of the method, etc.), or vice versa (e.g., wherein a conventional means is used until environmental conditions rendering the conventional means unsafe or unusable are determined, and one or more variations of the method is used in addition to the conventional means, in lieu of the conventional means, etc.). In another example, an operator can utilize a plurality of means of airspeed determination (e.g., simultaneously, in a selectable manner among the plurality, etc.) that includes variations of the system and/or method as well as alternative means. In further examples, sensor fusion techniques can be used (e.g., Kalman filtering), incorporating the inverted rotor model as an airspeed as a "sensor" input, to determine the correct airspeed and/or reject misleading sensor data (e.g., from a malfunctioning conventional airspeed sensor). Redundant airspeed indication systems can improve aircraft safety, operator performance and/or confidence, and other suitable aspects of aircraft operation.

Third, variations of the system and/or method can remove the need for alternative mechanisms of airspeed measurement and indication. For example, implementations of the system and/or method can enable a pitot tube network or other alternative direct airspeed measurement system to be removed from an aircraft, which can reduce aircraft weight, improve aerodynamic performance (e.g., by elimination of drag-producing features associated with the alternative mechanism), reduce complexity of aircraft system, and provide any other suitable benefits of component reduction in an engineering system.

Fourth, variations of the system and/or method can leverage the use of an electric drive train (e.g., an electric motor directly driving the rotor) to provide accurate torque output information (e.g., shaft power output of the electric motor as a function of input electrical power) without measuring the torque directly (e.g., using a specific sensor coupled to the drive mechanism intended to monitor the power output). Accurate knowledge of the torque is utilized in one or more variations of the method 100, and can be difficult to obtain without dedicated measurement apparatuses when using alternative propulsion systems (e.g., gas turbine propulsion, reciprocating internal combustion driven propulsion, etc.) due to the complex mechanical power transfer associated therewith. In addition, variations of the system and method can include using electrical actuators to control all aspects of rotor operation (e.g., blade pitch angle as a function of time, tilt angle as a function of time, etc.), which can enable the operating parameters to be determined as a direct function of the control inputs (e.g., voltage input to a servo motor, signal input to a tilt mechanism, etc.) instead of via direct or indirect measurement.

However, the system, method, and variations thereof can additionally or alternatively afford any other suitable benefits and/or advantages.

3. Method

As shown in FIG. 1, the method 100 can include: determining a rotor model S100, determining a set of rotor operating parameters S200, and computing an airspeed based on the set of rotor operating parameters in combination with the rotor model S300. The method 100 can optionally include: validating the computed airspeed S400, and/or any other suitable processes for determining an airspeed.

The method functions to determine the airspeed of an aircraft during forward motion through the air. The airspeed is preferably defined as the speed of the freestream relative to the aircraft during flight, but can additionally or alternatively be otherwise suitably defined. The method can also function to determine a model of rotor performance (e.g., a rotor model) to utilize in determining the airspeed (e.g., among a plurality of models, based on historical data, in real-time, etc.). The method can also function to provide one of a plurality of independently-derived airspeed measurements to an aircraft operator (e.g., pilot, autopilot, remote control system, etc.). However, the method 100 can additionally or alternatively have any other suitable function.

Block S100 includes determining a rotor model. Block S100 functions to obtain a mathematical relationship between the performance of the rotor of the aircraft under various operating conditions and the associated airspeed of the aircraft, for use in calculating the airspeed of the aircraft during operation based on rotor operating parameters (e.g., in accordance with one or more variations of Block S200, S300, etc.). In some variations, the model can directly relate the rotor operating performance and characteristics to the airspeed; in additional or alternative variations, the model can relate the rotor operating performance to a secondary parameter of the airflow proximal the rotor (e.g., the axial inflow velocity, the flowfield around the rotor acting as a lifting body, etc.) that enables the airspeed to be estimated based on the secondary parameter of the airflow (e.g., geometrically). However, the model can be otherwise suitably defined such that the operating characteristics of the rotor are related to the airspeed of the vehicle.

The model f is preferably of the form:

$$f:(M,\beta,\omega) \to \tilde{\upsilon}$$

where M is the shaft torque (e.g., applied to the rotor, rotor shaft torque, output torque of the electric motor, etc.), β is the blade pitch angle as described above, ω is the rotor angular velocity as described above, and ῦ is the estimate of the axial inflow velocity (e.g., into the propeller, into the rotor, etc.). In some cases (e.g., wherein the rotor is lightly loaded), the axial inflow velocity can be taken to be equal to the component of the freestream velocity aligned with the rotor axis. In additional or alternative examples (e.g., wherein the rotor is substantially loaded), the axial inflow velocity can include a component of self-induced inflow (e.g., induced via momentum exchange between the rotor and the flow during operation), and the model can include a corrective term to account for the self-induced inflow in computing the freestream velocity (e.g., and the airspeed pursuant to the freestream velocity). The model can additionally or alternatively be of the form described above and include additional model parameters, including air density $\rho$ and/or the sound speed $a=\sqrt{\gamma R_{air} T}$.

The blade pitch used in the model is preferably measured at the $\mu R$ station along the span of the blade, wherein $\mu$ is the fraction between 0 and 1 along the rotor radius R (e.g., span of the blade from the hub or other central member); however, the blade pitch can additionally or alternatively be otherwise measured or determined (e.g., as an average of the pitch at multiple stations along the span, span-wise to determine a mapping as a function of span position, etc.). In some variations, the blade pitch angle is a function of the station; in alternative variations, the blade pitch angle is constant (e.g., identical) at each station. In a specific example, the blade pitch used in the model is defined at $\mu=0.75$; however, in related examples, the blade pitch can additionally or alternatively be taken as the angle at any other suitable station along the span.

Block S100 can include determining a model for the coefficient of power (e.g., power coefficient, $C_p$, etc.) of the rotor, which is a function of the axial advance ratio $\lambda$ and the blade pitch angle $\beta$. Given a numerical value for $C_p$, the shaft torque M can be expressed as:

$$M = C_p(\lambda, \beta) \rho \pi \omega^2 R^5$$

where $\rho$ is the air density (e.g., predetermined as a function of measurable thermodynamic state variables such as temperature, barometric pressure, etc.), and the axial advance ratio $\lambda$ is a non-dimensional parameter defined as the ratio between the estimated axial inflow velocity $\tilde{v}$ and the linear speed of the blade $\omega R$, i.e.:

$$\lambda = \frac{\tilde{v}}{\omega R}.$$

Thus, determining a model for the power coefficient functions to provide an expression that can be evaluated (e.g., in subsequent Blocks of the method 100) based on known control inputs (e.g., shaft torque, RPM value, blade pitch angle, etc., determined in Block S200) to derive the axial inflow velocity, which can be used to determine the freestream velocity and thereby the airspeed of the aircraft (e.g., in Block S300).

In a first variation, Block S100 includes determining a linearized power coefficient model (e.g., a linearized model). The linearized model is preferably utilized (e.g., during vehicle operation) in cases wherein the rotor slipstream velocity is less than the axial inflow velocity. However, the linearized model can additionally or alternatively be used in any other suitable cases and/or conditions (e.g., wherein the axial inflow velocity and the rotor slipstream velocity are approximately equal, wherein the axial inflow velocity is less than the rotor slipstream velocity, etc.). The linearized model is preferably a linearization of an exact non-linear geometrically-derived model of $C_p$, but can additionally or alternatively be a linearization of any suitable non-linear model of $C_p$.

In the linearized model, it is preferably assumed that the loading (e.g., disc loading, aerodynamic loading, etc.) is applied entirely at the $\mu R$ station of the blade. However, in additional or alternative variations of the linearized model, the loading can be assumed to act on the blade at any suitable location and/or with any other suitable spatial distribution.

In a specific example of the linearized model, the linearized axial advance ratio is expressed as:

$$\tilde{\lambda} = \lambda_0 - \left. \frac{3 C_p \sqrt{1+\lambda_\mu^2}}{\pi \sigma \lambda_\mu} \right|_{\lambda_\mu = \frac{\lambda_0}{\mu}},$$

wherein the power coefficient is defined as $$C_p = \frac{M}{\rho \pi \omega^2 R^5},$$

and $\lambda_0$ represents the advance ratio corresponding to a freely spinning (e.g., zero loading) condition and is determined via the expression:

$$\lambda_0 = \mu \tan(\beta - \alpha_0),$$

wherein $\beta$ is the chosen pitch angle and $\alpha_0$ is the zero-lift angle of the airfoil defined by the blade geometry at the $\mu R$ station (e.g., as shown in FIG. 3C). Given the aforementioned parameters, the axial inflow velocity is given by:

$$\tilde{v} = \omega R \tilde{\lambda}.$$

In the aforementioned expressions, the rotor solidity $\sigma$ (e.g., the ratio of the total area of the rotor blades to the swept area of the rotor) and zero-lift angle $\alpha_0$ are geometric parameters of the rotor and blades thereof; in a specific example, the parameter values corresponding to the rotor of the aircraft are $\sigma=0.15$ and $\alpha_0=-2°$, but can additionally or alternatively have any suitable values corresponding to any suitable geometry (e.g., of the rotor or propeller, of the blades, etc.).

Figure 7:
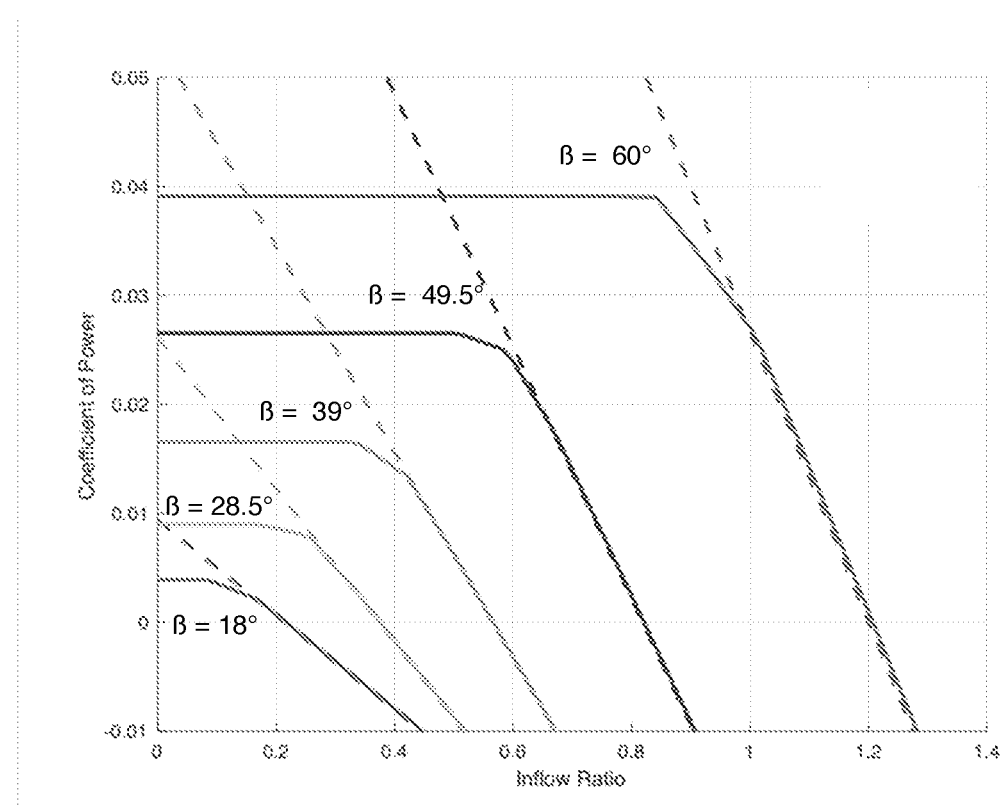
FIG. 7 depicts the output of an example implementation of a rotor model determined in accordance with a portion of a variation of the method for airspeed measurement.

As shown in FIG. 7, the linearized model results in a parameterization of the inflow ratio $\lambda$ and power coefficient $C_p$, for various values of the blade pitch angle $\beta$. Given the operating parameters of the rotor assembly (e.g., as determined in one or more variations of Block S200), the inflow velocity can be determined and the corresponding airspeed calculated (e.g., in one or more variations of Block S300) using the linearized model.

In another variation of Block S100, the rotor model can be determined from a computational fluid dynamic (CFD) simulation of the rotor. In this variation, the rotor operating parameters are simulated (e.g., rotor geometry, input moments and torques, adjusted blade pitch angles, angles between the disc plane and the freestream direction, etc.) and the resulting axial inflow velocity is computed as a direct result of the simulation. Various CFD techniques can be used in this variation, including: computer aided design (CAD) geometry generation, discretization of the geometry into any suitable mesh (e.g., uniform, non-uniform, structured, unstructured, using any suitable combination of hexahedral, tetrahedral, prismatic, pyramidal, and/or otherwise polyhedral elements, etc.), discretization of the governing equations according to any suitable scheme (e.g., finite volume, finite element, finite difference, spectral elements, boundary elements, high resolution schemes to capture shocks and other discontinuities, flux limiting schemes, etc.), utilization of any suitable boundary conditions (e.g., physical boundary conditions such as inflow, outflow, porous surface, moving surface, static surface, etc.; temporal boundary conditions such as initial conditions; etc.), various implemented physical models (e.g., equations of fluid motion such as the full Navier-Stokes equations, simplified Navier-Stokes, potential flow, etc.; turbulence models such as Reynolds-averaged Navier-Stokes, species conservation, enthalpy conservation, radiation models, etc.), and any other suitable CFD techniques and related physical simulation techniques. In this variation of Block S100, the CFD simulation preferably produces a parameterization of the axial inflow velocity in terms of measurable and/or controllable operating parameters (e.g., shaft torque, blade pitch angle, rotor RPM, tilt angle, etc.); however, the CFD simulation can additionally or alternatively produce any other suitable output model that can be evaluated to determine the axial inflow velocity and/or associated airspeed.

In another variation, Block S100 can include determining the rotor model by manual calibration. Manual calibration can include operating the rotor assembly across a parameter space of operating parameters (e.g., a range of blade pitch angles, shaft powers, tilt angles, etc.) and measuring the output (e.g., axial inflow velocity, slipstream flow velocity, aircraft airspeed, freestream velocity, etc.) to generate a rotor model that relates the operating parameters and output. Manual calibration can be performed during aircraft flight (e.g., using an auxiliary airspeed indicator or measurement device to measure the output), on the ground (e.g., in a wind tunnel), and/or in any other suitable manner.

Figure 8:
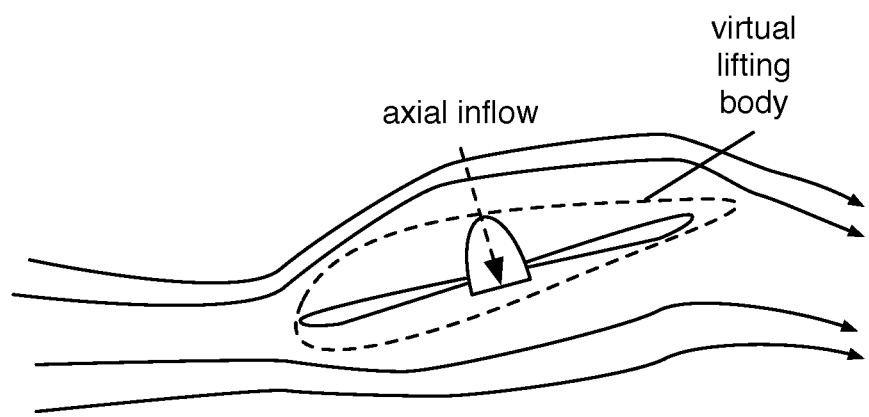
FIG. 8 depicts an example configuration wherein the rotor acts as a lifting body.

In another variation, Block S100 can include determining a lifting body model of the rotor. In this variation, the rotor model can relate the axial inflow velocity (e.g., and/or airspeed, directly) to the lift force generated by the rotor due to the rotor acting as a lifting body (e.g., an airfoil) as compared to the thrust supplied by the rotor (e.g., as shown in FIG. 8). This variation is preferably utilized in cases wherein the tilt angle of the rotor assembly is such that there is a small angle between the plane of the rotor disc and the freestream airflow (e.g., wherein the axis of rotation of the rotor is nearly perpendicular to the freestream airflow, but not entirely perpendicular such that there is a non-zero axial flow component through the rotor; wherein airspeed is estimated directly based on the lifting body model of the rotor and associated forces and moments on the rotor disc; etc.); however, this variation can additionally or alternatively be utilized in any other cases and/or configurations (e.g., wherein the axis of rotation of the rotor is nearly parallel to the freestream airflow direction). The lifting body model of the rotor can be determined analytically (e.g., modeling the rotor as a symmetric thin airfoil, a flat plate, a bluff body, etc.), empirically (e.g., utilizing a CFD model, a wind tunnel, a combination of virtual and physical experimentation, etc.), and/or by any other suitable technique.

However, Block S100 can additionally or alternatively include determining the rotor model in any suitable manner.

Block S200 includes determining the operating parameters of the rotor assembly. Block S200 functions to obtain the inputs (e.g., operating parameters) for the rotor model (e.g., as determined in accordance with one or more variations of Block S100), such that the airspeed can be calculated using the model (e.g., in accordance with one or more variations of Block S300). Block S200 preferably includes determining, for at least one rotor assembly of the aircraft, a set of operating parameters including: the blade pitch angle of each blade of the rotor, the tilt angle of the rotor assembly, the shaft torque applied to the rotor via the drive mechanism of the rotor assembly, and the instantaneous RPM of the rotor. The set of operating parameters can optionally include: the air density, other thermodynamic parameters of the air from which air density can be computed (e.g., using a table of thermodynamic variables including two or more of total pressure, static pressure, density, temperature, specific volume, vapor fraction, etc.), power efficiency of the rotor assembly (e.g., temperature dependent efficiency, electric motor power efficiency, direct drive gearbox efficiency, etc.), time-dependent thermal properties of the rotor assembly (e.g., temperature of various rotor assembly components), and any other suitable operating parameters related to the rotor and/or rotor assembly operation (e.g., rotor operating parameters).

In relation to Block S200, each of the operating parameters is preferably determined based on the control input provided to the rotor assembly (e.g., by a pilot, automatically provided by a control system, etc.) without active sensing (e.g., without a dedicated sensor or transducer that independently measures the operating parameter); however, the operating parameters can additionally or alternatively be determined via active sensing or otherwise suitably determined. In some variations, Block S200 can include determining the operating parameter based on actuator feedback (e.g., back-EMF from an electronic servomotor, a signal from a feedback control loop that controls an actuator, etc.). In additional or alternative variations, the operating parameter can be determined via direct sensing (e.g., of actual versus commanded actuator state), indirect sensing (e.g., sensing of related actuators that do not directly actuate the propeller state), and/or otherwise suitably determined.

In relation to Block S200, each of the operating parameters preferably corresponds to an electronic actuator (e.g., an electric motor, an electric servomotor, a stepper motor, etc.), and thus each operating parameter can be determined via sampling the electronic control signal and/or power signal associated with the actuator; for example, the rotor RPM and shaft torque can be directly related to the input power to the electric motor (e.g., that directly drives the rotor), and thus determining the rotor RPM and shaft torque can include determining the input electrical power to the electric motor driving the rotor assembly (e.g., computing the rotor RPM and/or shaft torque via a predetermined calibration curve in terms of the input power, voltage, current, etc.; utilizing a predetermined or otherwise known I-V curve of the motor; utilizing a functional relationship between input electrical power and the output torque and RPM, such as $I*V=\eta(\tau*\omega)$, wherein I is the electrical current, V is the voltage, $\eta$ is the overall efficiency, $\tau$ is the torque, and $\omega$ is the angular frequency; otherwise suitably calculating the RPM and/or shaft torque; etc.). Thus, the method can enable the omission of duplicate signals that encode the operating parameters (e.g., from transducers that may otherwise be required). In some variations, forces and/or moments on the aircraft can be measured by sampling control inputs and/or sensing the state of other actuators (e.g., tilt actuators that transition the propulsion assemblies from forward to hover configurations, actuators that adjust the position of control surfaces of the aircraft, etc.). However, in variations wherein some operating parameters do not correspond to an associated electronic actuator, the operating parameters can be otherwise suitably determined (e.g., via indirect inference).

In relation to Block S200, the set of rotor operating parameters is preferably determined substantially continuously during flight. In variations wherein Block S200 includes sampling operating parameters from control signals, the operating parameters can be determined directly from analog control signals, sampled from digital control signals at any suitable frequency (e.g., at a continuous sampling rate about 100 Hz, between 1-10 Hz, any other suitable frequency, etc.), sampled from digital monitor outputs (e.g., an I/O port of a computing system), and/or otherwise suitably sampled, or determined. However, in additional or alternative variations, Block S200 can be performed in real-time, substantially real time, according to a schedule (e.g., associated with various portions of a flight, associated with various times of day, etc.), in response to a trigger event (e.g., failure of an auxiliary airspeed measurement mechanism), and/or otherwise suitably performed with any other suitable temporal characteristics.

Block S300 includes computing an airspeed based on the set of rotor operating parameters (e.g., as determined in Block S200 and/or a variation thereof) in combination with the rotor model (e.g., as determined in Block S100 and/or a variation thereof). Block S300 functions to transform the set of operating parameters into an airspeed of the aircraft, according to the rotor model. Block S300 can also function to validate the airspeed computation.

In a variation, Block S300 includes computing the airspeed of the aircraft based on the set of rotor operating parameters including the blade pitch angle, the shaft torque output by the electric motor, and the rotation rate (e.g., RPM) of the rotor, by evaluating the linearized model using the set of rotor operating parameters as inputs. In this variation, the axial inflow velocity determined as an output of the rotor model is assumed to equal the airspeed. However, in alternative variations, Block S300 can include correcting the airspeed computation (e.g., by applying a correction factor to account for the slipstream velocity and/or any other suitable non-idealities that may affect the assumptions of the linearized model).

In a related variation, Block S300 includes computing the airspeed of the aircraft based on the set of rotor operating parameters including the tilt angle. In this variation, as shown in FIG. 5, the rotor assembly can be at a non-zero tilt angle $\phi$, and the axial inflow velocity computed in accordance with the rotor model (e.g., the linearized model, the nonlinear model, a CFD-derived model, etc.) can be divided by the cosine of the non-zero tilt angle to obtain the estimated freestream velocity ($V_\infty$), and thus the airspeed (e.g., assumed equal to the estimated freestream velocity). In implementations of this variation, the non-zero tilt angle is preferably less than or equal to about 60°. In cases wherein a geometrically derived rotor model (e.g., the linearized model, a nonlinear model based on the rotor geometry, etc.) is used and the angle exceeds about 60° away from the freestream direction, Block S300 can include applying a correction factor (e.g., in addition to the cosine factor) to the computed airspeed to account for departures from the geometrically-derived rotor model. In cases wherein the angle approaches or equals 90°, any other suitable correction can be applied in lieu of and/or supplemented for dividing by the cosine of the non-zero tilt angle (i.e., to avoid a divide-by-zero operation). However, Block S300 can include any other suitable manner of incorporating the tilt angle into the computation of the airspeed.

Figure 6:
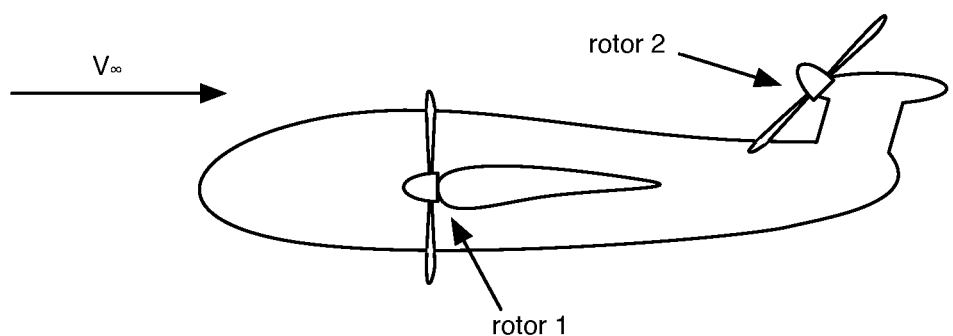
FIG. 6 depicts an example relative orientation of rotors of an aircraft used in conjunction with a variation of the method for airspeed measurement.

In another variation, Block S300 can include computing the airspeed based on the operating parameters corresponding to a plurality of rotor assemblies. For example, Block S300 can include averaging the axial inflow velocities computed in conjunction with two or more rotors of the aircraft, and determining the airspeed based on the averaged axial inflow velocity (e.g., wherein the airspeed is assumed to be equal to the average axial inflow velocity, equal to the average axial inflow velocity multiplied by a cosine factor corresponding to each rotor assembly's tilt angle, etc.). In this example and related examples, the rotors can all be tilted at the same angle (e.g., all tilted into the forward arrangement as shown in FIG. 4B), at different angles (e.g., as shown in FIG. 6), or otherwise suitably arranged.

In a related variation, Block S300 can include determining a weight factor associated with each of a plurality of airspeeds computed in conjunction with a plurality of rotors. The weight factor can be based on an error associated with the tilt angle of each rotor, wherein the tilt angles may be different. For example, as shown in FIG. 6, a first rotor (e.g., rotor 1) can be configured in a forward configuration while a second rotor (e.g., rotor 2) is configured at a non-zero tilt angle, and Block S300 can include assigning a larger weight factor (e.g., corresponding to a smaller error in the airspeed calculation) to the first rotor and a smaller weight factor (e.g., corresponding to a larger error in the airspeed calculation) to the second rotor. Accordingly, Block S300 can include computing a weighted airspeed, wherein the weighted airspeed is computed as a weighted sum of the airspeed computations associated with each rotor, weighted by the weight factor. Block S300 can additionally or alternatively include selecting from among a plurality of airspeed measurements, based on the weight factor of each (e.g., selecting the computation associated with the largest weight factor, selecting the airspeed measurements associated with the two highest weight factors and averaging them, etc.). The weight factor can additionally or alternatively be based on the position of each rotor with respect to other portions of the aircraft (e.g., wherein a larger weight factor is assigned to rotors arranged towards the nose of the aircraft due to fewer aerodynamic disturbances being present due to rotor slipstreams), and/or have any other suitable basis.

Block S300 is preferably performed in substantially real time during flight, but can additionally or alternatively be performed periodically (e.g., at the same frequency as the determination of the rotor operating parameters, with any suitable frequency, etc.), asynchronously, in response to a trigger (e.g., failure of an auxiliary airspeed indicator or measurement system, anomalous control feedback triggers a sanity check, detection of icing conditions, etc.), and/or with any other suitable temporal characteristics.

The method 100 can optionally include Block S350, which includes computing forces and/or moments on the aircraft based on the set of rotor operating parameters in combination with the rotor model. In some variations, forces and/or moments can be computed based on the thrust acting upon the aircraft as determined using the rotor model (e.g., model of the power coefficient of the one or more rotors as a function of rotor operating parameters substantially as described above). In additional or alternative variations, forces and/or moments can be computed based on the lift acting upon the aircraft as determined using the rotor model (e.g., wherein the rotor is modeled as a lifting body, and the lift force on the aircraft from the one or more rotors is determined). However, the forces and/or moments on the aircraft can be otherwise suitably computed based on the determined state(s) of the rotors of the aircraft.

The method 100 can optionally include Block S400, which includes validating the computed airspeed. The computed airspeed is preferably a result of other portions of the method 100 (e.g., Block S300), but can be otherwise suitably obtained. Validating the computed airspeed can include comparing the airspeed determined via the inverted rotor model to the airspeed determined or measured via another technique and/or in association with another of a plurality of rotors. Validating the computed airspeed can include incorporating the computed airspeed into a sensor fusion process and assessing the reliability of the computed airspeed.

However, Block S400 can additionally or alternatively include otherwise suitably validating the computed airspeed.

In a first variation, Block S400 can include measuring the airspeed of the aircraft using an auxiliary airspeed measurement device (e.g., pitot probe, air data boom, etc.), and comparing the airspeed measured via the auxiliary device with the computed airspeed (e.g., via Block S300) to validate one or the other of the two measurements. In some cases (e.g., operating conditions, flight conditions, scenarios, etc.), the confidence level in the computed airspeed based on the rotor model may be higher than the confidence in the alternatively-measured airspeed, and thus the airspeed computed based on the rotor model can be used to validate that the auxiliary airspeed measurement device is functioning properly. In other cases, the confidence level in the alternatively-measured airspeed may be higher than the confidence in the airspeed computed based on the rotor model, and thus the alternatively-computed airspeed can be used to validate that the rotor-model-based airspeed computation is functioning properly. In examples of this variation, the confidence level can be expressed quantitatively by a confidence metric. In such examples, Block S400 can include determining a confidence metric associated with each determined airspeed, and validating the determined airspeed associated with the confidence metric of the lower value using the determined airspeed associated with the confidence metric of the higher value. However, cross-validation between multiple methods (e.g., independent methods) for airspeed determination can be otherwise suitably performed.

In another variation, Block S400 can include exchanging telemetry with a ground station to validate the airspeed measurement. For example, a ground station can monitor windspeed and wind heading in the vicinity of the aircraft and monitor the ground speed of the aircraft; infer (e.g., estimate) an airspeed of the aircraft based on the monitored data related to the aircraft; receive airspeed measurements from the aircraft as telemetry (e.g., computed in accordance with one or more variations of Blocks S100, S200, and S300), and validate the received measurements and/or the inferred airspeed based on a comparison between the two values.

In another variation, Block S400 can include combining the airspeed determination via the rotor model with additional sensors monitoring the state of the aircraft, in order to perform cross-validation of the various sensor signals. For example, in a sensor fusion scheme that combines airspeed information with other aircraft state information, Block S400 can include validating the computed airspeed by combining the output (e.g., determined airspeed based on the rotor model in combination with the rotor operating parameters) with other sensor output in a sensor fusion process to estimate the state of the aircraft. In such an example, the other sensor inputs besides the airspeed sensor (e.g., a virtual sensor defined by the inverse rotor model computation) can validate the airspeed sensor when the various inputs agree as to the state of the aircraft; conversely, the agreement (or disagreement) of the airspeed sensor with other sensor inputs can validate (or invalidate) the other sensor data (e.g., to determine whether another airspeed sensor, such as an auxiliary airspeed measurement device, is working properly or not). However, Block S400 can additionally or alternatively include otherwise suitably combining the airspeed determination with any other suitable flight data to determine the state of the aircraft (e.g., including the airspeed of the aircraft).

However, Block S400 can additionally or alternatively include validating the airspeed measurement in any other suitable manner.

In a specific implementation, the method 100 includes determining a rotor model relating a power coefficient of a propeller of the aircraft to an axial inflow velocity through the propeller as a function of a set of rotor operating parameters (e.g., a blade pitch angle of each blade of the propeller, a shaft torque applied to the propeller by the electric motor, an RPM value of the propeller, a tilt angle of the propeller, etc.). In this example, the method 100 includes determining the set of rotor operating parameters by sampling an electronic control signal associated with an electric motor actuating the propeller (e.g., an analog power signal controlled by an onboard computer or other controller, a digital control signal input, etc.). Once the set of rotor operating parameters are determined (e.g., in real time, in near-real time, etc.), the method includes computing the axial inflow velocity through the propeller based on the set of rotor operating parameters (e.g., using the rotor model, by providing the rotor operating parameters as inputs). In this and related examples, the method 100 can additionally or alternatively include determining a set of environmental parameters (e.g., an air density and sound speed proximal the aircraft), and computing the axial inflow velocity through the propeller based on the set of rotor operating parameters and the set of environmental parameters; however, in cases wherein the environmental parameters are known or fall within narrow ranges that do not substantially affect the output of the model, environmental parameter values can be assumed (e.g., as a function of known variables, as average values, etc.). In this example, the method includes computing the airspeed of the aircraft based on the axial inflow velocity (e.g., resulting in a determined airspeed). In cases wherein the aircraft is a tilt-rotor aircraft and the propeller is tilted relative to the freestream airflow direction, computing the airspeed based on the axial inflow velocity can further include dividing the axial inflow velocity by the cosine of the tilt angle to geometrically account for the tilt factor. In this example and related examples, the method includes measuring the airspeed (e.g., independently of the inverse rotor model methodology) using an auxiliary airspeed measurement device (e.g., a ground-based airspeed measurement device, an onboard air data boom, another rotor assembly arranged elsewhere on the aircraft, etc.) to generate a second determined airspeed, and comparing the first determined airspeed to the second determined airspeed to generate a validation metric. The validation metric can be used to validate either the first or second determined airspeed (e.g., based on a confidence level or confidence metric associated with each determined airspeed), such that in this example and in related examples the method includes validating at least one of the first determined airspeed and the second determined airspeed based on the validation metric.

In cases wherein the auxiliary airspeed measurement device includes a ground-based airspeed measurement device, the method can include exchanging telemetry between the aircraft and a ground station (e.g., to generate the second determined airspeed). In such instances, the method can include monitoring windspeed and the wind heading proximal the aircraft at the ground station (e.g., using an instrument at the ground station), as well as monitoring the effective ground speed and heading of the aircraft relative to the ground station (e.g., using an instrument at the ground station such as a radar), in order to determine the airspeed of the aircraft (e.g., the second determined airspeed to validate the first determined airspeed or be validated by the first determined airspeed).

Although omitted for conciseness, the preferred embodiments include every combination and permutation of the various system components and method blocks, which can be combined in any suitable permutation or combination and/or omitted in whole or in part from variations of the preferred embodiments. No ordering or sequence is necessarily implied other than where explicitly stated with respect to method blocks and/or processes; Blocks of the method 100 and variations thereof can be repeated, performed iteratively, and/or executed in any suitable order, in addition to being omitted in whole or in part in variations of the method 100.

As a person skilled in the art will recognize from the previous detailed description and from the figures and claims, modifications and changes can be made to the preferred embodiments of the invention without departing from the scope of this invention defined in the following claims.

What is claimed is:

1. A method for an aircraft comprising:
   determining a set of propeller operating parameters based on an electronic control signal controlling actuation of a propeller;
   determining an inflow velocity through the propeller based on the set of propeller operating parameters and a propeller model relating a power coefficient of the propeller of the aircraft to the inflow velocity through the propeller; and
   determining a vehicle state parameter of the aircraft based on the inflow velocity through the propeller.

2. The method of claim 1, wherein the inflow velocity comprises an axial inflow velocity.

3. The method of claim 1, wherein the set of rotor operating parameters further comprises a tilt angle of the propeller, wherein determining the vehicle state parameter further comprises modifying at least one of the inflow velocity by a correction factor relating the tilt angle of the propeller to the inflow velocity.

4. The method of claim 1, wherein vehicle state parameter comprises an airspeed of the aircraft.

5. The method of claim 4, wherein the airspeed of the aircraft is not determined by an airflow sensor unless a trigger condition is satisfied.

6. The method of claim 5, wherein the trigger condition comprises an inflow velocity exceeding a threshold.

7. The method of claim 6, wherein the threshold comprises a slipstream velocity value behind the propeller.

8. The method of claim 5, wherein the set of rotor operating parameters further comprises a tilt angle of the propeller, wherein the trigger condition comprises the tilt angle outside of a threshold range.

9. The method of claim 1, wherein vehicle state parameter comprises at least one of a force on the aircraft or moment on the aircraft.

10. The method of claim 1, further comprising: measuring the vehicle state parameter using an auxiliary measurement device to generate a second determined vehicle state parameter; comparing the determined vehicle state parameter to the second determined vehicle state parameter to generate a validation metric; and validating the second determined vehicle state parameter based on the validation metric.

11. The method of claim 1, wherein the propeller comprises a fixed-pitch propeller.

12. A method for an aircraft comprising:
    determining a first measurement with an air data sensor, the first measurement associated with a vehicle state parameter of the aircraft;
    determining a set of operating parameters based on an electronic control signal associated with an aerodynamic actuator;
    calculating a first value of an airflow parameter based on the set of operating parameters using a model relating a power coefficient of the aerodynamic actuator to an airflow parameter; and
    determining the vehicle state parameter of the aircraft based on the first measurement and the first value.

13. The method of claim 12, wherein the aerodynamic actuator comprises a rotary aerodynamic actuator.

14. The method of claim 12, wherein the airflow parameter comprises an axial inflow velocity.

15. The method of claim 12, wherein vehicle state parameter comprises an airspeed of the aircraft.

16. The method of claim 12, wherein vehicle state parameter comprises at least one of a force on the aircraft or moment on the aircraft.

17. The method of claim 12, further comprising:
    determining a second set of operating parameters based on a second electronic control signal associated with a second aerodynamic actuator; and
    calculating a second value of the airflow parameter based on the second set of operating parameters using a second model relating a second power coefficient of the second aerodynamic actuator to the airflow parameter;
    wherein the vehicle state parameter of the aircraft is further determined based on the second value.

18. The method of claim 17, wherein determining the vehicle state parameter comprises: fusing the first measurement, first value, and second value within a Kalman filter.

19. The method of claim 12, wherein the aerodynamic actuator comprises a rotor, wherein the electronic control signal controls the actuation of an electric motor, the electric motor mechanically coupled to a rotor of the aircraft.

20. The method of claim 12, wherein the set of operating parameters comprises a pitch angle of the aerodynamic actuator.

21. The method of claim 12, wherein determining the vehicle state parameter of the aircraft comprises a cross-validation of the first measurement against the first value.

* * * * *